(12) United States Patent
Nakamoto

(10) Patent No.: US 8,141,397 B2
(45) Date of Patent: Mar. 27, 2012

(54) KEY REGULATING DEVICE

(75) Inventor: Yuji Nakamoto, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 102 days.

(21) Appl. No.: 12/695,958

(22) Filed: Jan. 28, 2010

(65) Prior Publication Data

US 2010/0192646 A1 Aug. 5, 2010

(30) Foreign Application Priority Data

Feb. 3, 2009 (JP) ................................ 2009-022914

(51) Int. Cl.
*B60R 25/02* (2006.01)
*F16C 3/00* (2006.01)
*G05G 5/00* (2006.01)
(52) U.S. Cl. ................. 70/186; 70/182; 70/252
(58) Field of Classification Search .............. 70/182, 70/183, 184, 185, 186, 252
See application file for complete search history.

(56) References Cited

U.S. PATENT DOCUMENTS

| | | | |
|---|---|---|---|
| 4,945,740 A | | 8/1990 | Kawano et al. |
| 5,065,604 A | * | 11/1991 | Pattock ........................ 70/239 |
| 5,255,547 A | | 10/1993 | Burr et al. |
| 5,504,468 A | * | 4/1996 | Hattori et al. ............... 335/278 |
| 5,685,183 A | * | 11/1997 | Hattori et al. ................ 70/252 |
| 6,427,503 B2 | * | 8/2002 | Kataumi et al. ............. 70/183 |
| 6,881,173 B2 | * | 4/2005 | Harada et al. .............. 477/99 |
| 7,267,018 B2 | * | 9/2007 | Kai ............................ 70/252 |
| 7,302,817 B2 | * | 12/2007 | Ohtaki et al. ............... 70/186 |
| 2010/0192645 A1 | * | 8/2010 | Nakamoto ................... 70/183 |
| 2010/0192649 A1 | * | 8/2010 | Nakamoto ................... 70/252 |

FOREIGN PATENT DOCUMENTS

| | | |
|---|---|---|
| EP | 0300911 A1 | 1/1989 |
| GB | 1383137 A | 2/1975 |
| JP | 4744629 A | 12/1972 |
| JP | 2000-229557 A | 8/2000 |

OTHER PUBLICATIONS

Extended European Search Report issued Mar. 2, 2011 in corresponding EP Application No. 10000872.1.

* cited by examiner

*Primary Examiner* — Suzanne Barrett
*Assistant Examiner* — David E. Sosnowski
(74) *Attorney, Agent, or Firm* — Roberts Mlotkowski Safran & Cole, P.C.

(57) ABSTRACT

A driving section and a regulating member are easily mounted to a subject of assembly. In an interlock unit, a solenoid, a shaft, a link, a release link, and a torsion spring are integrated together by means of a unit box. By the interlock unit being mounted to a lock body, the solenoid, the shaft, the link, the release link and the torsion spring can be mounted to the lock body. For this reason, it is not necessary that the solenoid, the shaft, the link, the release link and the torsion spring are separately mounted to the lock body, and the solenoid, the shaft, the link, the release link and the torsion spring can be easily mounted to the lock body.

9 Claims, 10 Drawing Sheets

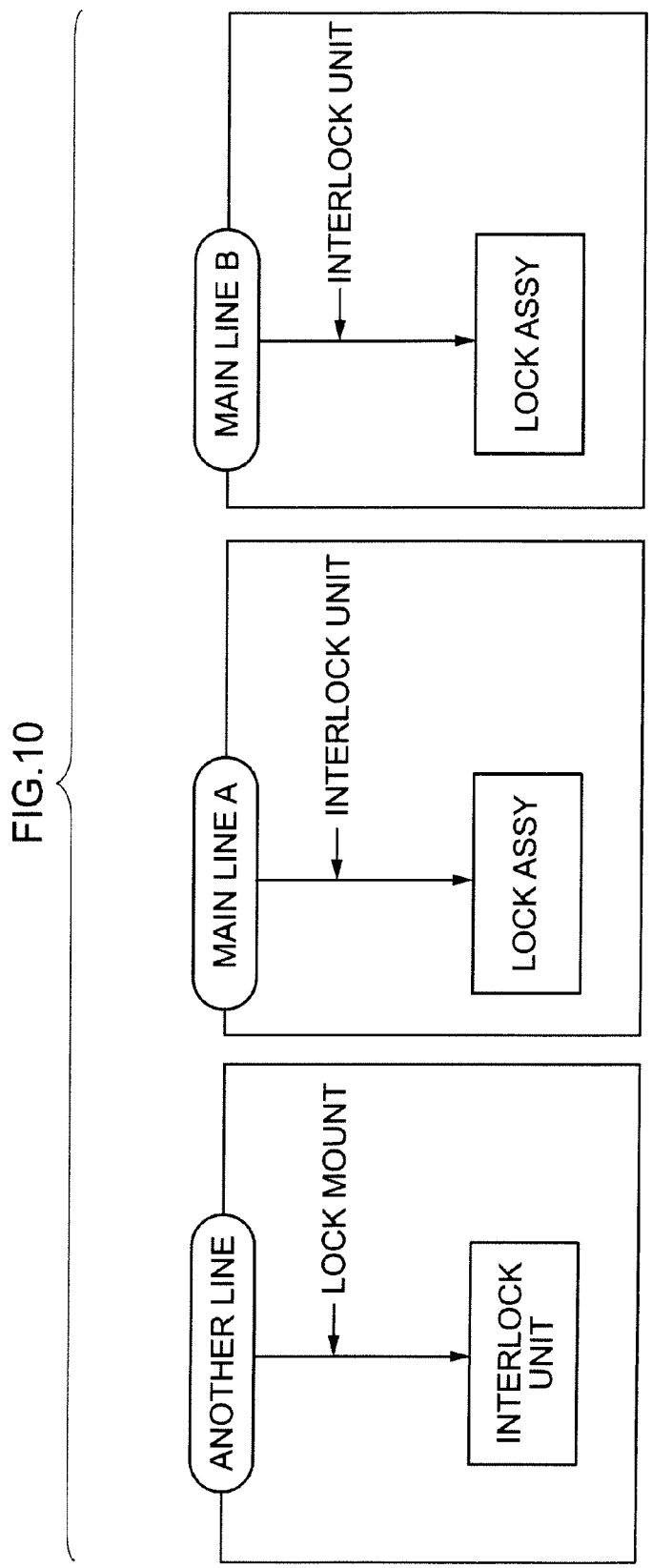

KEY REGULATING DEVICE

CROSS-REFERENCE TO RELATED APPLICATION

This application claims priority under 35 USC 119 from Japanese Patent Application No. 2009-022914, the disclosure of which is incorporated by reference herein.

BACKGROUND OF THE INVENTION

1. Technical Field

The present invention relates to a key regulating device that regulates rotation of a key.

2. Related Art

There are key regulating devices in which a position to which swing position of a stopper can be switched by driving a solenoid, and rotation of a key between a "LOCK" position and an "ACC" position can be locked by a stopper (for example, see Japanese Patent Application Laid-Open (JP-A) No. 2000-229557).

However, in such key devices, the solenoid and the stopper need to be separately assembled and mounted to a knob body. For this reason, it is difficult for the solenoid and the stopper to be assembled and mounted to the knob body (a subject of assembly).

SUMMARY OF THE INVENTION

In view of the above-described circumstances, an object of the present invention is to provide a key regulating device that makes it possible to easily assemble a driving section and a regulating member to a subject of assembly.

A key regulating device according to a first aspect of the present invention includes: a driving section provided with a driving member, the driving section being configured to drive the driving member; a regulating member that can be switched between a regulated state and an allowed state by driving the driving member, the regulating member regulating rotation of a key to a predetermined rotational position when switched to the regulated state and allowing rotation of the key to the predetermined rotational position when switched to the allowed state; and an integration member that integrates the driving section and the regulating member such that the driving section and the regulating member that are integrated with the integration member are configured to be mounted to a subject of assembly.

A key regulating device according to a second aspect of the present invention further includes, in the key regulating device of the first aspect, a support shaft that rotatably supports the regulating member, wherein the driving section, the regulating member, the integration member and the support shaft are configured to be mounted together along an axial direction of the support shaft.

A key regulating device according to a third aspect of the present invention further includes, in the key regulating device of the first or second aspect, an urging member that urges the regulating member, wherein the urging member is configured to be engaged with the integration member in a state in which the driving section and the regulating member are integrated by the integration member.

In a key regulating device according to a fourth aspect of the present invention in the key regulating device of the second aspect, the integration member includes a one side member and the other side member, the one side member and the other side member being assembled along the axial direction of the support shaft.

In a key regulating device according to a fifth aspect of the present invention in the key regulating device of the fourth aspect, an engaging portion is formed at one of the one side member or the other side member, and an engaged portion that is engaged with the engaging portion is formed at the other of the one side member or the other side member.

In a key regulating device according to a sixth aspect of the present invention in the key regulating device of the second aspect, both side ends of the support shaft are supported at the one side member and the other side member, respectively.

In the key regulating device of the first aspect, the driving section is provided with the driving member, and the driving means is made to be able to drive the driving member, and further, the regulating member can be switched between the regulated state and the allowed state by driving the driving member. Moreover, when the regulating member is switched to the regulated state, it regulates rotation of a key to a predetermined rotational position, while when the regulating member is switched to the allowed state, it allows rotation of the key to the predetermined rotational position.

Here, the integration member causes the driving section and the regulating member to be integrated together and allows them (the driving section and the regulating member that are integrated with the integration member) to be mounted to a subject of assembly. For this reason, it is not necessary that the driving section and the regulating member are separately mounted to the subject of assembly, and the driving section and the regulating member can be easily mounted to the subject of assembly.

In the key regulating device of the second aspect, the fourth aspect, the fifth aspect or the sixth aspect, the support shaft supports the regulating member in a rotatable manner.

Here, the driving section, the regulating member, the integration member and the support shaft can be mounted together along the axial direction of the support shaft. For this reason, it is not necessary that the driving section, the regulating member, the integration member and the support shaft are mounted from different directions. As a result, the driving section, the regulating member, the integration member and the support shaft can be easily mounted together.

In the key regulating device of the third second aspect, the urging member urges the regulating member.

Here, in a state in which the integration member causes the driving section and the regulating member to be integrated together, the urging member can be engaged with the integration member. For this reason, when the integration member causes the driving section and the regulating member to be integrated together, it is not necessary that the urging member is engaged with the integration member. As a result, the urging member can be easily engaged with the integration member.

BRIEF DESCRIPTION OF THE DRAWINGS

Embodiments of the invention will be described in detail with reference to the following figures, wherein:

FIG. 10 is a block diagram showing a process of assembling the interlock unit and two types of steering lock devices in the exemplary embodiment of the present invention.

DETAILED DESCRIPTION OF THE INVENTION

Figure 7:
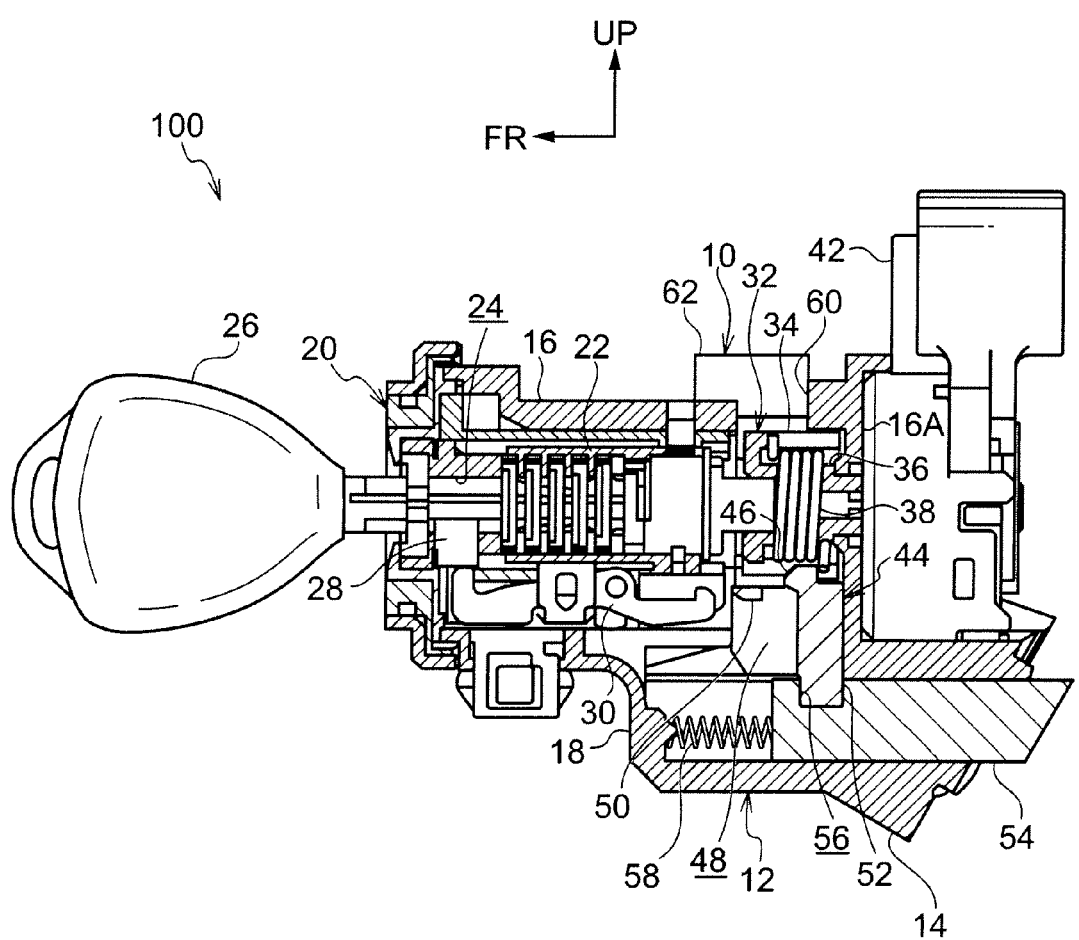
FIG. 7 is a cross sectional view showing a steering lock device according to an exemplary embodiment of the present invention, when seen from the left side.

FIG. 7 shows a cross sectional view of a steering lock device 100 to which an interlock unit 10 according to an exemplary embodiment of the present invention is applied, when seen from the left side. In the attached drawings, the front side of the steering lock device 100 is indicated by arrow FR, the upper side of the steering lock device 100 is indicated by arrow UP, and the right side of the steering lock device 100 is indicated by arrow RH.

Figure 5:
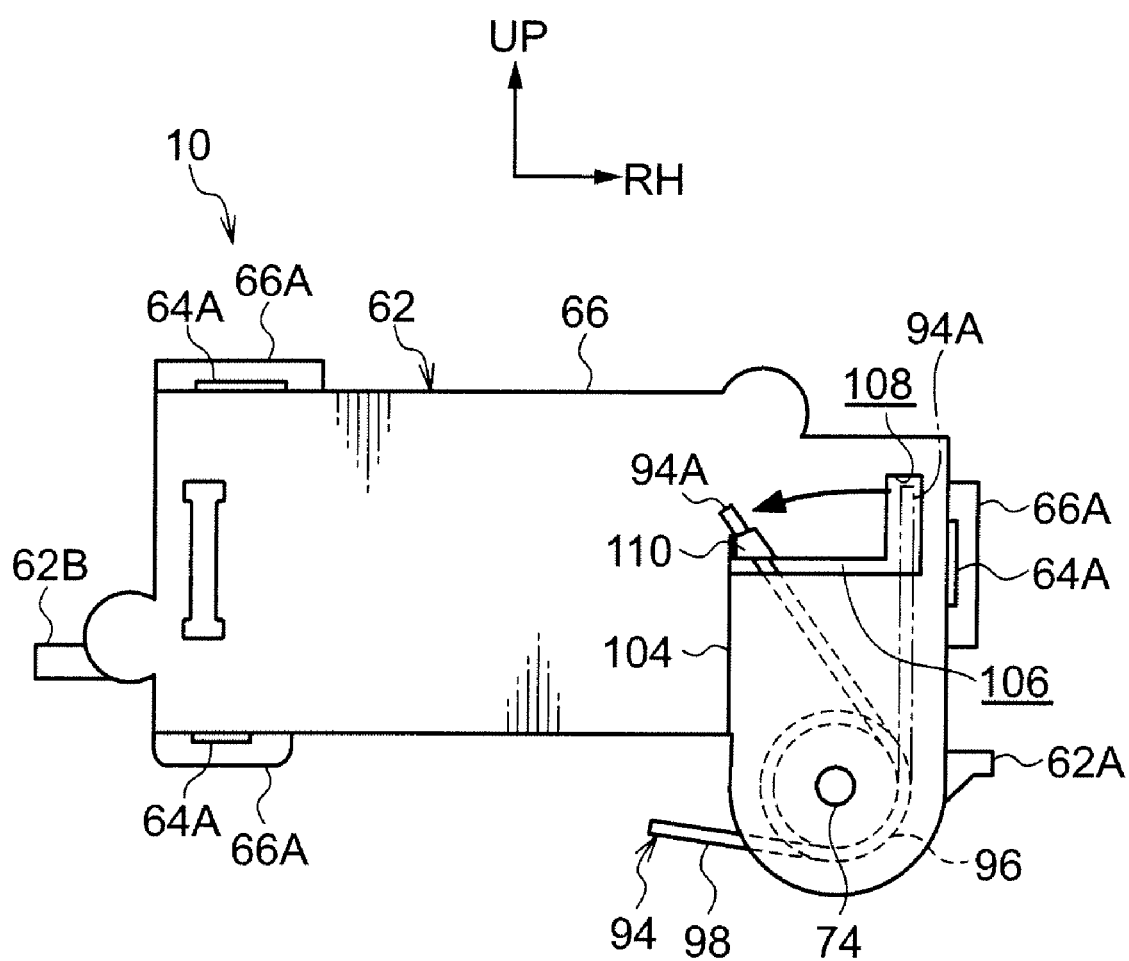
FIG. 5 is a back view showing the interlock unit according to the exemplary embodiment of the present invention, when seen from the rear side.
Figure 6:
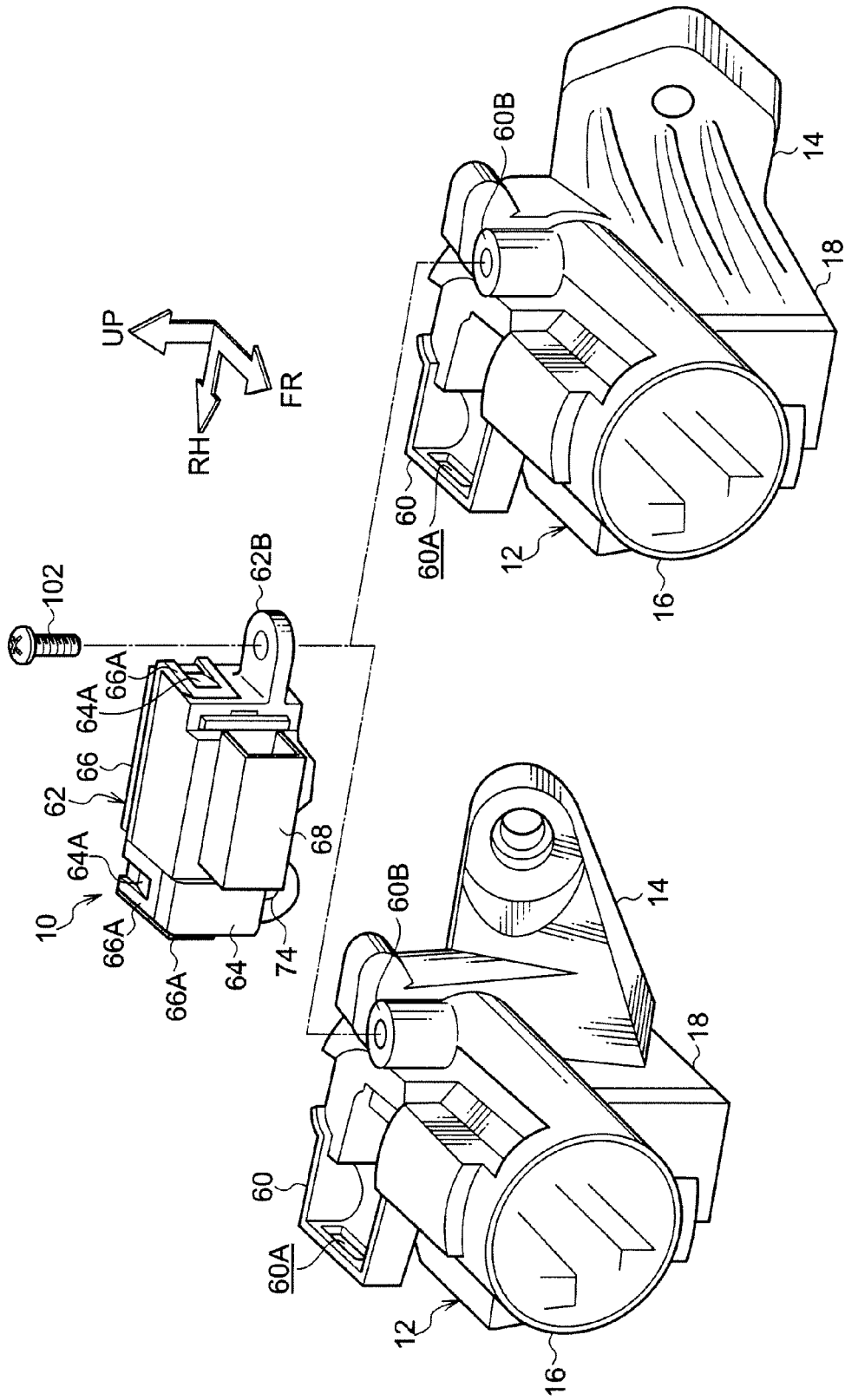
FIG. 6 is an exploded perspective view showing an interlock unit according to the exemplary embodiment and two types of lock bodies, when seen obliquely from the front of the left side.

As shown in FIG. 6, the steering lock device 10 according to the present exemplary embodiment is equipped with a lock body 12 that serves as an accommodating member, and a fixed piece 14 (see FIG. 5) having a substantially semi-cylinder shape is formed at the rear end of the lower side portion of the lock body 12. The bracket (not shown in the drawings) having a substantially semi-cylinder shape is mounted to the fixed piece 14. A steering post (not shown in the drawings) of a vehicle is fitted in an inner portion of the bracket and the fixed piece 14, whereby the lock body 12 is fixed to the steering post, and the steering lock device 10 is mounted to the steering post.

A substantially cylinder shaped accommodating cylinder 16 is formed at the upper side portion of the lock body 12, and a rear wall 16A is formed at the rear end of the accommodating cylinder 16. A lock cylinder 18 having a substantially rectangular tube shape is formed at the lower side of the rear side portion of the accommodating cylinder 16, and the respective inner sides of the accommodating cylinder 16 and the lock cylinder 18 communicate with each other. The front surface of the lock cylinder 18 is closed, and the rear surface of the lock cylinder 18 is opened toward the rear side via the fixed piece 14.

A substantially circular cylinder (column) shaped ignition cylinder 20 that serves as a key cylinder is accommodated within the accommodating cylinder 16. The front end of the ignition cylinder 20 is made to protrude from the front end of the accommodating cylinder 16 to the front side. The front end of the ignition cylinder 20 is disposed in an instrument panel (not shown in the drawings) of a vehicle, and the front surface of the ignition cylinder 20 is directed from the instrument panel to the interior of the vehicle.

A key rotor 22 having a substantially circular cylinder (column) shape and serving as an insert member is accommodated in the ignition cylinder 20, and front side movement of the key rotor 22 is stopped (not allowed). An insertion hole 24 having a rectangular pillar shape is formed within the key rotor 22, and the insertion hole 24 is opened from the front surface of the key rotor 22.

The key rotor 22 is arranged at a "LOCK" position that serves as a predetermined rotational position, and an ignition key 26 (a regular key) serving as a key can be inserted in and pulled out from the insertion hole 24. By the ignition key 26 being inserted in the insertion hole 24 and operated to rotate, the key rotor 22 can be rotated in the ignition cylinder 20, whereby the key rotor 22 can be arranged at the "ACC" position, "ON" position or "START" position. Further, only when the key rotor 22 is arranged at the "LOCK" position, the ignition key 26 can be inserted in and pulled out from the insertion hole 24, and when the key rotor 22 is arranged at the "ACC" position, "ON" position or "START" position, the operation of the ignition key 26 being inserted in and pulled out from the insertion hole 24 is regulated.

A slide piece 28 having a substantially U-shaped frame-like configuration is provided in the lower portion of the front portion of the key rotor 22 so as to be movable in the vertical (upper and lower) direction (in the radial direction of the key rotor 22). The lower side surface (the outer side surface in the radial direction of the key rotor 22) of the slide piece 28 abuts against the inner peripheral surface of the ignition cylinder 20 so that movement of the slide piece to the lower side direction (to the outer side in the radial direction of the key rotor 22) is stopped (not allowed). The lower side surface of the slide piece 28 is curved along the inner peripheral surface of the ignition cylinder 20, and the slide piece 28 is rotatable integrally with the key rotor 22. Further, the lower side surface of the slide piece 28 is opened toward the lower side via the outer peripheral portion of the ignition cylinder 20.

The upper portion (the inner side portion in the radial direction of the key rotor 22) of the slide piece 28 forms the outer peripheral surface of the insertion hole 24 of the key rotor 22. In the state in which the ignition key 26 is inserted in the insertion hole 24, the ignition key 26 regulates movement of the slide piece 28 to the upper side (to the inner side in the radial direction of the key rotor 22). To the contrary, in the state in which the ignition key 26 is pulled out from the insertion hole 24, movement of the slide piece 28 to the upper side is allowed.

An elongated plate-shaped lock plate 30 is supported by the lower portion of the ignition cylinder 20 at the intermediate portion in the longitudinal (front and rear) direction in such a manner as to be rotatable and movable in the vertical (upper and lower) direction. The lock plate 30 is urged in a direction to which it moves upper side, and further, is urged such that the front end of the lock plate rotates to the upper side and the rear end thereof rotates to the lower side. A front side portion and a rear side portion of the lock plate 30 are each formed substantially into an L-shaped plate, and a front end and a rear end of the lock plate 30 are each made to protrude to the upper side.

The front end of the lock plate 30 passes through (penetrates) the outer peripheral portion of the ignition cylinder 20 and is made to abut against the lower side surface of the slide piece 28. When the ignition key 26 is inserted in the insertion hole 24, movement of the slide piece 28 to the upper side is regulated, whereby rotation of the lock plate 30 by means of the urging force is regulated. To the contrary, when the ignition key 26 is pulled out from the insertion hole 24, movement of the slide piece 28 to the upper side is allowed, whereby the front end of the lock plate 30 moves the slide piece 28 to the upper side by means of the urging force, the front end of the lock plate 30 is rotated to the upper side, and the rear end of the lock plate 30 is rotated to the lower side. Moreover, when the key rotor 22 is arranged at the "ACC" position, "ON" position or "START" position, the front end of the lock plate 30 is made to abut against the outer peripheral surface of the key rotor 22, whereby rotation of the lock plate 30 by means of the urging force is regulated.

A cam shaft 32 that serves as a rotating member is rotatably accommodated within the accommodating cylinder 16 at the rear side of the ignition cylinder 20. A substantially cylinder shaped outer cylinder 34 is provided at the side of the outer periphery of the cam shaft 32 and a substantially cylinder shaped inner cylinder 36 is provided at the side of the inner periphery of the cam shaft 32. The outer cylinder 34 and the inner cylinder 36 are integrated with each other at their respective front ends. Further, the inner cylinder 36 passes through (penetrates) the rear wall 16A of the accommodating cylinder 16 and protrudes to the rear side of the accommodating cylinder 16.

The rear end of the key rotor 22 is fitted into the inner cylinder 36, and the cam shaft 32 is rotatable so as to be integrated with the key rotor 22.

A return spring 38 that serves as a rotation urging member is accommodated within the outer cylinder 34 on the outer periphery of the inner cylinder 36, and one end (the front side end) of the return spring 38 is connected (latched) to the outer cylinder 34. When the cam shaft 32 is moved to be arranged from the "ON" position to the "START" position, the other end (the rear side end) of the return spring 38 is connected within the accommodating cylinder 16, and the cam shaft 32 is urged in a direction from the "START" position to the "ON" position.

An inclined surface (not shown in the drawings) is formed in the lower side portion of the outer cylinder 34, and the inclined surface is made to slope to a direction which is from the "START" position of the key rotor 22 to the "LOCK" position via the "ON" position and the "ACC" position in accordance from the rear side to the front side. A regulating surface 40 (see FIGS. 7 and 8) is formed on the upper side portion of the outer cylinder 34, and the regulating surface 40 is disposed perpendicular to the circumferential direction of the outer cylinder 34.

An ignition switch 42 is fixed at the rear side of the accommodating cylinder 16, and the inner cylinder 36 rear end of the cam shaft 32 is inserted in the ignition switch 42. As a result, due to the cam shaft 32 being connected to the ignition switch 42 and the cam shaft 32 being rotated integrally with the key rotor 22, the ignition switch 42 can be operated.

A substantially rectangular pillar shaped slider 44 that serves as a connecting member is accommodated in the accommodating cylinder 16 at the lower side of the cam shaft 32, and the slider 44 is movable (slidable) in the longitudinal (front and rear) direction integrally with a lock bar 54, as described below.

A moving protrusion 46 having a pillar shape is formed in a rear portion of the slider 44, and the moving protrusion 46 protrudes to the upper side from the slider 44. An inclined surface of the cam shaft 32 (outer cylinder 34) comes into contact with the moving protrusion 46 by means of the urging force of a compression spring 58 described later, by this, the slider 44 abuts against the rear wall 16A of the accommodating cylinder 16 such that movement to the rear side is stopped (not allowed), and rotation of the cam shaft 32 is inhibited and the key rotor 22 is, as described above, arranged at the "LOCK" position.

A plate-shaped engagement hole 48 is formed in the front side portion of the slider 44 at the central part in the horizontal (left and right) direction. The engagement hole 48 is opened at the front side, upper side and lower side of the slider 44. A substantially trapezoidal plate-shaped engagement protrusion 50 is formed at the front end and upper end of the slider 44 and the engagement protrusion 50 is disposed within the engagement hole 48. A rectangular pillar shaped fitting protrusion 52 is formed at the rear end of the slider 44 and the fitting protrusion 52 is made to protrude to the lower side from the slider 44.

A substantially rectangular pillar shaped lock bar 54 that serves as a lock member is accommodated within the lock cylinder 18. The lock bar 54 is guided by the lock cylinder 18 and is movable (slidable) in the longitudinal (front and rear) direction.

A fitting concave portion 56 having a rectangular pillar shape is formed at the upper end of the front portion of the lock bar 54. The fitting concave portion 56 is opened at the upper side from the lock bar 54. The fitting protrusion 52 of the slider 44 is fitted into the fitting concave portion 56, and the lock bar 54 can be moved in the longitudinal (front and rear) direction in such a manner as to be integrated with the slider 44.

A compression spring 58 that serves as lock urging member is bridged between the front end of the lock cylinder 18 and the front end of the lock bar 54. The compression spring 58 urges the lock bar 54 and the slider 44 to the rear side. As a result, due to the urging force of the compression spring 58, the slider 44 is made to abut against the rear wall 16A of the accommodating cylinder 16, and movement of the slider 44 and the lock bar 54 to the rear side is stopped (not allowed).

The lock bar 54 protrudes to the rear side from the lock cylinder 18 and also protrudes to the rear side from the fixed piece 14. The lock bar 54 is made to pass through (penetrates) the above-described steering post and is engaged with the steering shaft (not shown in the drawings) within the steering post. As a result, rotation of the steering shaft is locked and rotation of a steering wheel (not shown in the drawings) which is fixed at the upper end of the steering shaft is locked.

As shown in FIG. 6, a substantially rectangular tube shaped mounting portion 60 is formed in the rear portion at the upper end of the accommodating cylinder 16, and a lower wall of the mounting portion 60 is partially opened, so that the interior of the mounting portion communicates with the interior of the accommodating cylinder 16. An elongated rectangular mounting hole 60A is formed so as to pass through (penetrate) the right end of the mounting portion 60, and a substantially cylinder shaped mounting cylinder 60B is formed at the left end of the mounting portion 60.

The interlock unit 10 serving as a key regulating device is mounted in the mounting portion 60.

Figure 4:
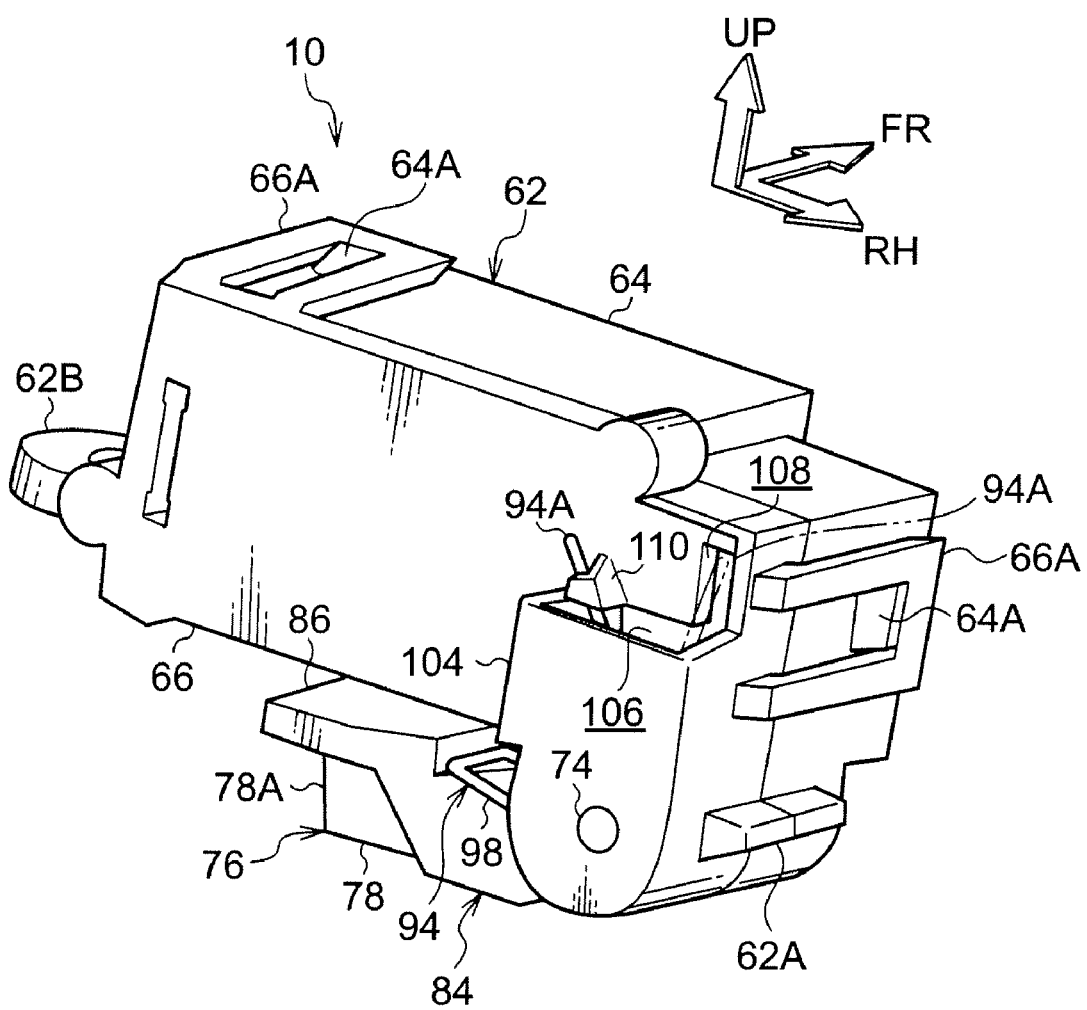
FIG. 4 is a perspective view showing the interlock unit according to the exemplary embodiment of the present invention, when seen obliquely from the rear of the right side.

As shown in FIG. 4 and FIG. 5, a substantially rectangular parallelepiped-shaped unit box 62 that serves as an integration member is provided at the outer periphery of the interlock unit 10. A substantially trapezoidal pillar shaped mounting protrusion 62A is formed so as to protrude at the right end and the lower end of the unit box 62, and a substantially ring plate shaped mounting plate 62B is formed so as to protrude at the left end and lower end of the unit box 62. The mounting protrusion 62A is inserted (engaged) in the mounting hole 60A of the mounting portion 60, and the mounting plate 62B is fastened to the mounting cylinder 60B of the mounting portion 60 by screw-engagement of a screw 102. As a result, the unit box 62 is fixed to the mounting portion 60 and the interlock unit 10 is assembled in the mounting portion 60. Further, the lower wall of the unit box 62 is partially opened, and the interior of the unit box 62 communicates with the interior of the accommodating cylinder 16 via an open portion on the lower wall of the mounting portion 60.

Figure 1:
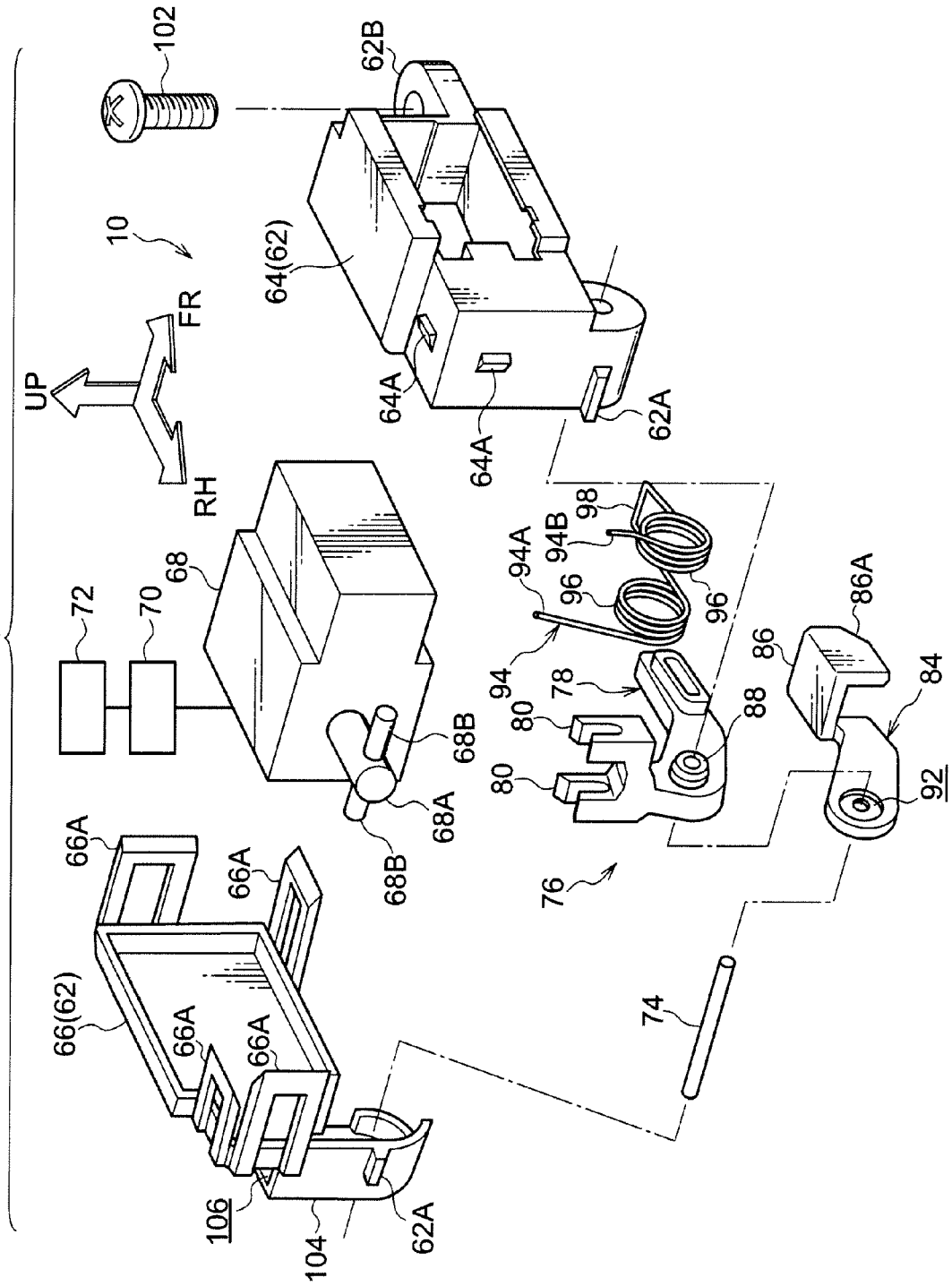
FIG. 1 is an exploded perspective view showing an interlock unit according to an exemplary embodiment of the present invention, when seen obliquely from the front of the right side.

As shown in FIG. 1, the unit box 62 is formed by a combination of a front side case 64 and a rear side cover 66. A predetermined number of mounting posts 64A each having a substantially triangle pole configuration is formed in extending manner on the peripheral surface of the case 64, and a predetermined number of mounting frames 66A each having a rectangular frame shape is formed in the cover 66 so as to extend. The mounting frames 66A are made to extend from the cover 66 to the front side (toward the case 64 side), and the mounting posts 64A are inserted (engaged) in the mounting frames 66A, whereby the case 64 and the cover 66 are assembled with each other in the longitudinal (front and rear) direction.

As shown in FIG. 4 and FIG. 5, the rear wall of the cover 66 is made to protrude to the rear side at the lower side portion at the right end of the cover 66, so as to form a passing convex portion 104 having a U-shaped cross sectional configuration. The upper surface of the passing convex portion 104 is opened so as to form a rectangular shaped movement hole 106 that forms an operation hole. A rectangular passing hole 108 that forms an operation hole is formed to pass through (penetrate) at the upper side of the right end of the passing convex portion 104 at the rear wall of the cover 66, and the lower end of the passing hole 108 communicates with the interior of the passing convex portion 104 via the movement hole 106. A plate shaped engagement portion 110 having an L-shaped cross sectional configuration is formed in protruding manner in the rear wall of the cover 66 at the upper side of the left end of the passing convex portion 104, and the engagement portion 110 is made to protrude to the rear side (to the outer side of the unit box 62) from the cover 66. A tip end side portion of the engagement portion 110 is made to extend to the left side.

As shown in FIG. 1, a solenoid 68 that serves as a driving section is accommodated within the unit box 62. The solenoid 68 includes a circular cylinder (column) shaped plunger 68A serving as a driving member, and the tip end of the plunger 68A is protrude from the solenoid 68 to the right side. An engagement shaft 68B, that forms the driving member, in the shape of a circular shaft passes through (penetrates) the end of the plunger 68A, and the engagement shaft 68B protrudes from the plunger 68A in the longitudinal (front and rear) direction.

The solenoid 68 is connected to a shift lever device 72 of the vehicle via a vehicle control device 70. When a shift lever (not shown in the drawings) of the shift lever device 72 is operated to move to a shift position (an allowable shift position such as an "R" shift position, an "N" shift position, a "D" shift position or the like) other than the "P" shift position (a regulated shift position), the solenoid 68 is driven by control of the control device 70, to regulate movement of the plunger 68A to the right side (to drive the plunger 68A), whereby an increase in the amount of the plunger 68A protruding from the solenoid 68 is regulated (see FIG. 8). To the contrary, when the shift lever of the shift lever device 72 is operated to move to the "P" shift position, the solenoid 68 is not driven, and movement of the plunger 68A to the right side is allowed (not the plunger 68A being driven), whereby an increase in the amount of the plunger 68A protruding from the solenoid 68 is allowed (see FIG. 9).

In the unit box 62, a circular shaft shaped shaft 74 that serves as a support shaft is supported at the right side and the lower side of the solenoid 68. The axial direction of the shaft 74 is disposed along the longitudinal (front and rear) direction, and both ends of the shaft 74 in the axial direction thereof are supported by the case 64 and the cover 66 of the unit box 62, respectively.

Figure 2:
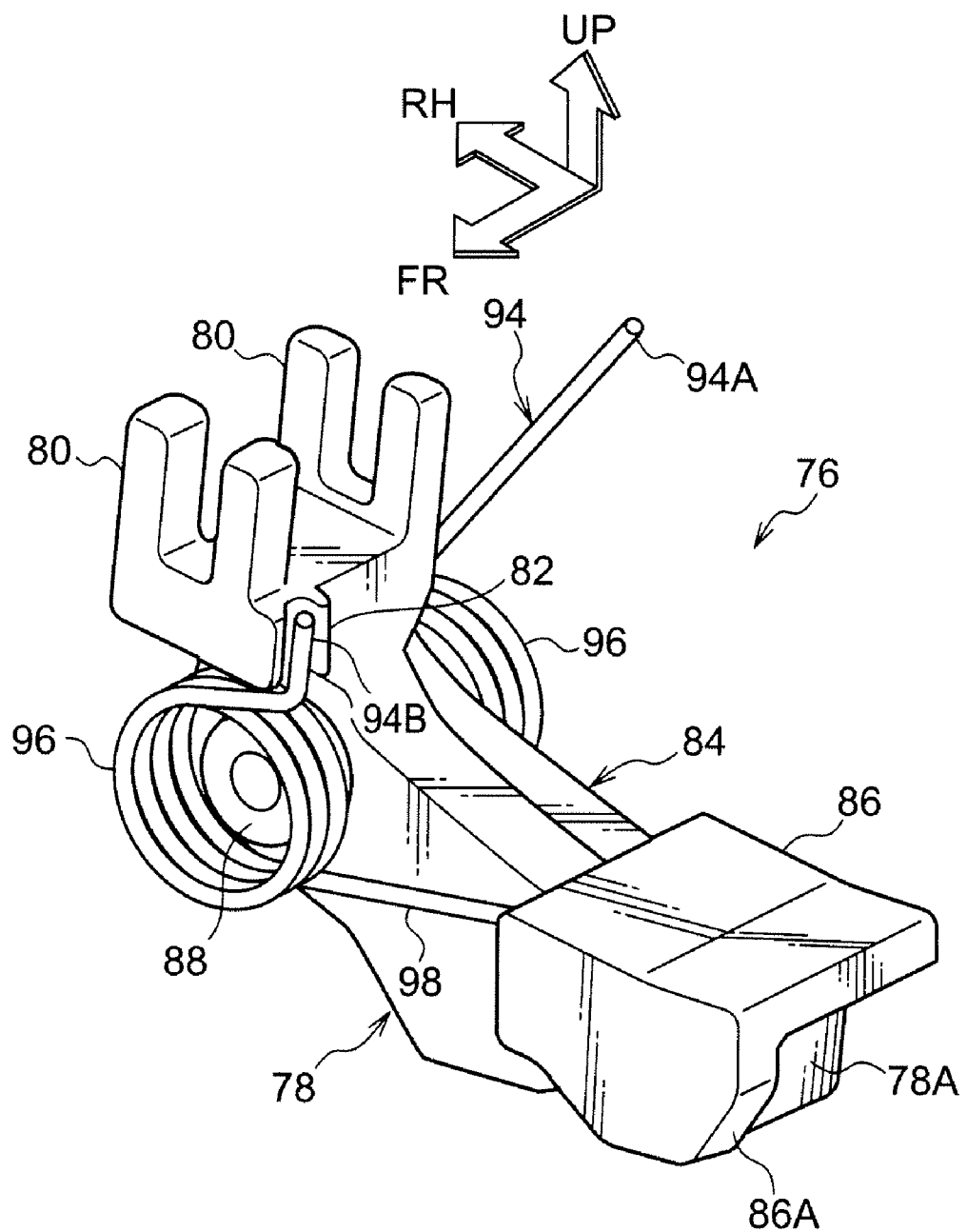
FIG. 2 is a perspective view showing a link unit in the interlock unit according to the exemplary embodiment of the present invention, when seen obliquely from the front of the left side.
Figure 3:
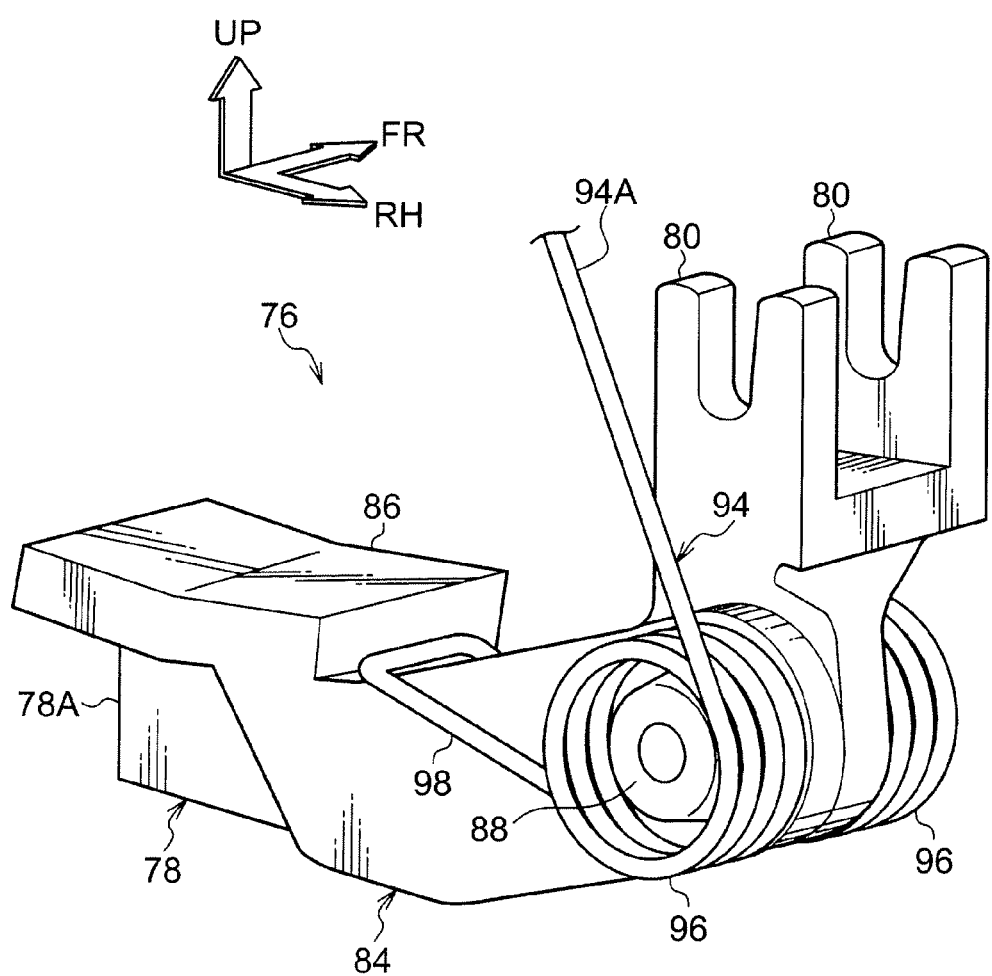
FIG. 3 is a perspective view showing a link unit in the interlock unit according to the exemplary embodiment of the present invention, when seen obliquely from the rear of the right side.

A link unit 76 that is also shown in FIG. 2 and FIG. 3 is supported at the shaft 74.

A longitudinal-direction intermediate portion of a link 78 having an substantially L-shaped cross sectional configuration and serving as a regulating member that forms the link unit 76 is supported by the shaft 74 in a rotatable manner, and a pair of U-shaped engagement frames 80 are formed integrally at the upper side end of the link 78. The pair of engagement frames 80 face each other in the longitudinal direction (front and rear direction). The tip end of the plunger 68A of the solenoid 68 is inserted between the pair of engagement frames 80, and the engagement shaft 68B of the plunger 68A tip end is inserted in the pair of engagement frames 80. As a result, the upper side end of the link 78 is engaged with the tip end of the plunger 68A in rotatable and movable manner.

A hook portion 82 having a U-shaped cross sectional configuration is formed integrally with the upper side end of the link 78 at the front and left sides of the link, and the interior of the hook portion 82 (see FIG. 2) is opened to the left side.

An upper side end of a substantially plate-shaped release link 84 serving as an allowing member that forms the link unit 76 is supported by the shaft 74 in a rotatable manner, and the release link 84 is disposed at the rear side of the link 78. A release plate 86 having a plate like L-shaped cross section is formed integrally with the lower side end of the release link 84. The release plate 86 is disposed in the upper and front sides of the lower side end of the link 78. A release surface 86A is formed on the front side plate of the release plate 86 in a portion of the left and lower sides (see FIG. 2). The release surface 86A is formed so as to be inclined toward the upper side as directed toward left side, and is disposed at the left side of the lower side end surface 78A of the link 78.

Substantially circular shaft-shaped spring holding shafts 88 that serve as a holding portion are formed in portions supported by the shaft 74 so as to be provided integrally with the link 78 and the release link 84 respectively. The shaft 74 passes through (penetrates) and is fitted in the spring holding shafts 88 at the central shaft portions thereof. The spring holding shaft 88 of the link 78 protrudes from the link 78 to the front side (which side is opposite to that in which the release link 84 is disposed). The spring holding shaft 88 of the release link 84 protrudes from the release link 84 to the rear side (which side is opposite to that in which the link 78 is disposed).

A substantially circular cylinder (column) shaped fitting convex portion (not shown in the drawings) that forms a fitting portion is formed integrally with the rear side surface of the link 78 in a portion supported by the shaft 74, and the shaft 74 is made to pass through (penetrate) and fitted in the fitting convex portion in the central shaft portion thereof.

A substantially circular cylinder (column) fitting concave portion 92 that forms the fitting portion is formed integrally with the front side surface of the release link 84 in a portion supported by the shaft 74, and the shaft 74 is made to pass through the fitting concave portion 92 in the central shaft portion thereof. The fitting convex portion of the link 78 is fitted in the fitting concave portion 92 in a rotatable manner, whereby the link 78 and the release link 84 are positioned (aligned) in such a state as to be relatively rotatable.

A torsion spring 94 serving as an urging member that forms the link unit 76 is held in the link 78 and the release link 84.

Spiral portions 96 having spiral configuration each serving as a holding member are formed at the front side portion and rear side portion of the torsion spring 94, respectively. The spring holding shaft 88 of the link 78 is inserted in the front side spiral portion 96 so as to be held by the spring holding shaft 88. The spring holding shaft 88 of the release link 84 is inserted in the rear side spiral portion 96 so as to be held by the spring holding shaft 88.

A U-shaped connecting portion 98 is formed at the intermediate portion of the torsion spring 94 in the longitudinal direction (front and rear direction). The connecting portion 98 connects the pair of spiral portions 96 with each other. As a result, the torsion spring 94 limits being away of the link 78 and the release link 84 in the longitudinal direction (front and rear direction), to restrict cancellation of a state in which the fitting convex portion of the link 78 and the fitting concave portion 92 of the release link 84 are fitted each other, whereby the link 78 and the release link 84 are held. Further, the intermediate portion of the connecting portion 98 is disposed at the upper side of the lower side end of the link 78 and the lower side end of the release link 84.

The rear side end 94A of the torsion spring 94 is made to extend to the upper side from the rear side spiral portion 96. As shown in FIG. 4 and FIG. 5, the rear side end 94A of the torsion spring 94 is made to extend to the upper side from the interior of the passing convex portion 104 of the rear wall of the cover 66 via the movement hole 106 by passing through the passing hole 108 of the rear wall of the cover 66. The rear side end 94A of the torsion spring 94 is made to be moved (rotated) to the left side against the urging force of the torsion spring 94 (the rear side spiral portion 96), and is hooked (engaged) in the engagement portion 110 of the rear wall of the cover 66. As a result, the torsion spring 94 generates urging force at the rear side spiral portion 96, and, at the intermediate portion of the connecting portion 98 of the torsion spring 94, it urges the lower side end of the release link 84 to the lower side.

As shown in FIG. 2, the front side end 94B of the torsion spring 94 is made to extend to the upper side from the front side spiral portion 96, and is hooked (engaged) in the hook portion 82 of the link 78. As a result, the torsion spring 94 generates urging force at the front side spiral portion 96, and the link 78 is urged such that the lower end of the rink 78 is rotated to the upper side, whereby the lower side end of the link 78 is made to abut against the upper side plate of the release plate 86 of the release link 84, and the link 78 and the release link 84 are made rotatable in an integrated manner.

Figure 8:
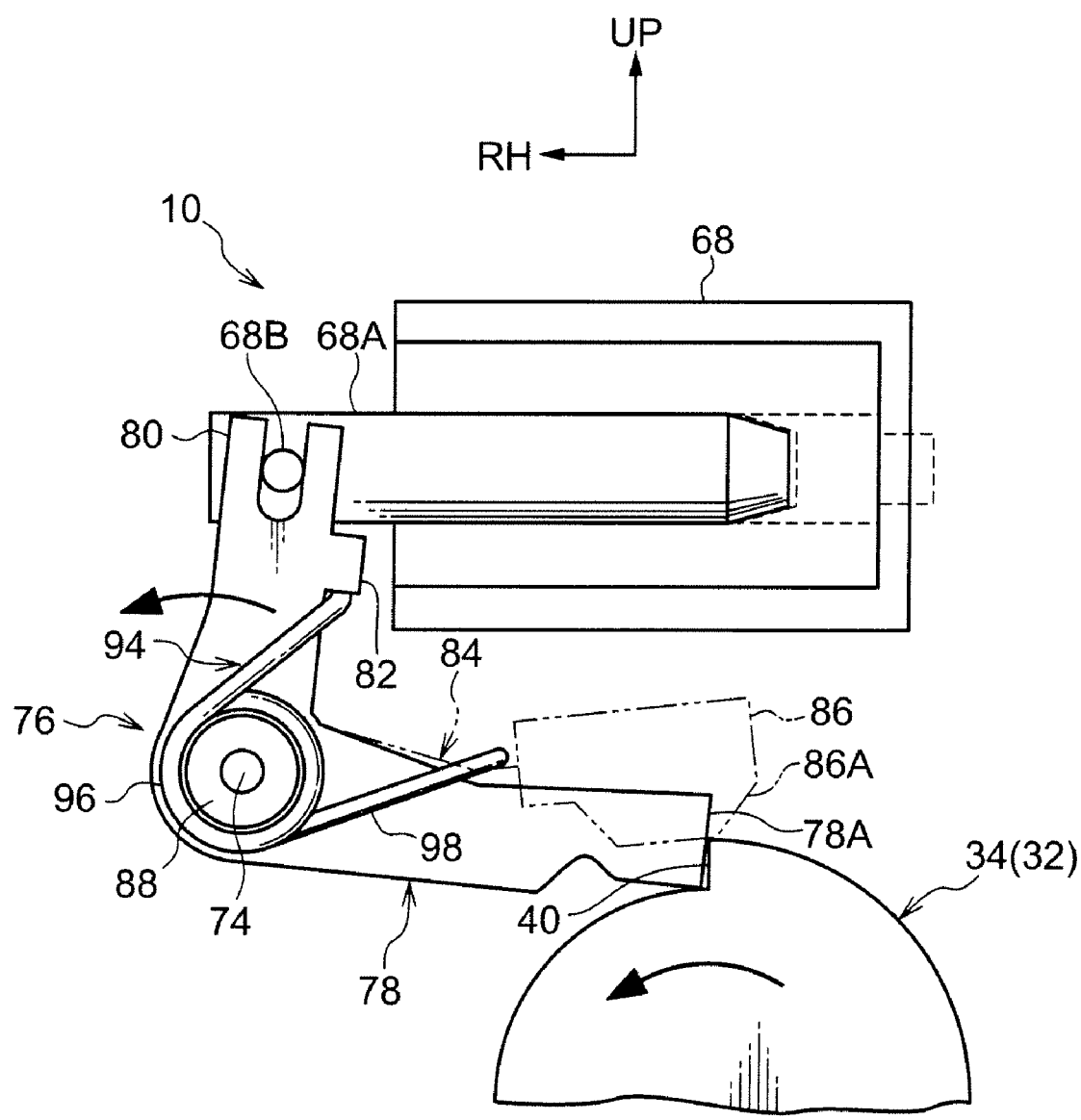
FIG. 8 is a cross sectional view showing an operation of the interlock unit according to the exemplary embodiment of the present invention when a shift lever is operated to move to a shift position other than a "P" shift position, when seen from the front.
Figure 9:
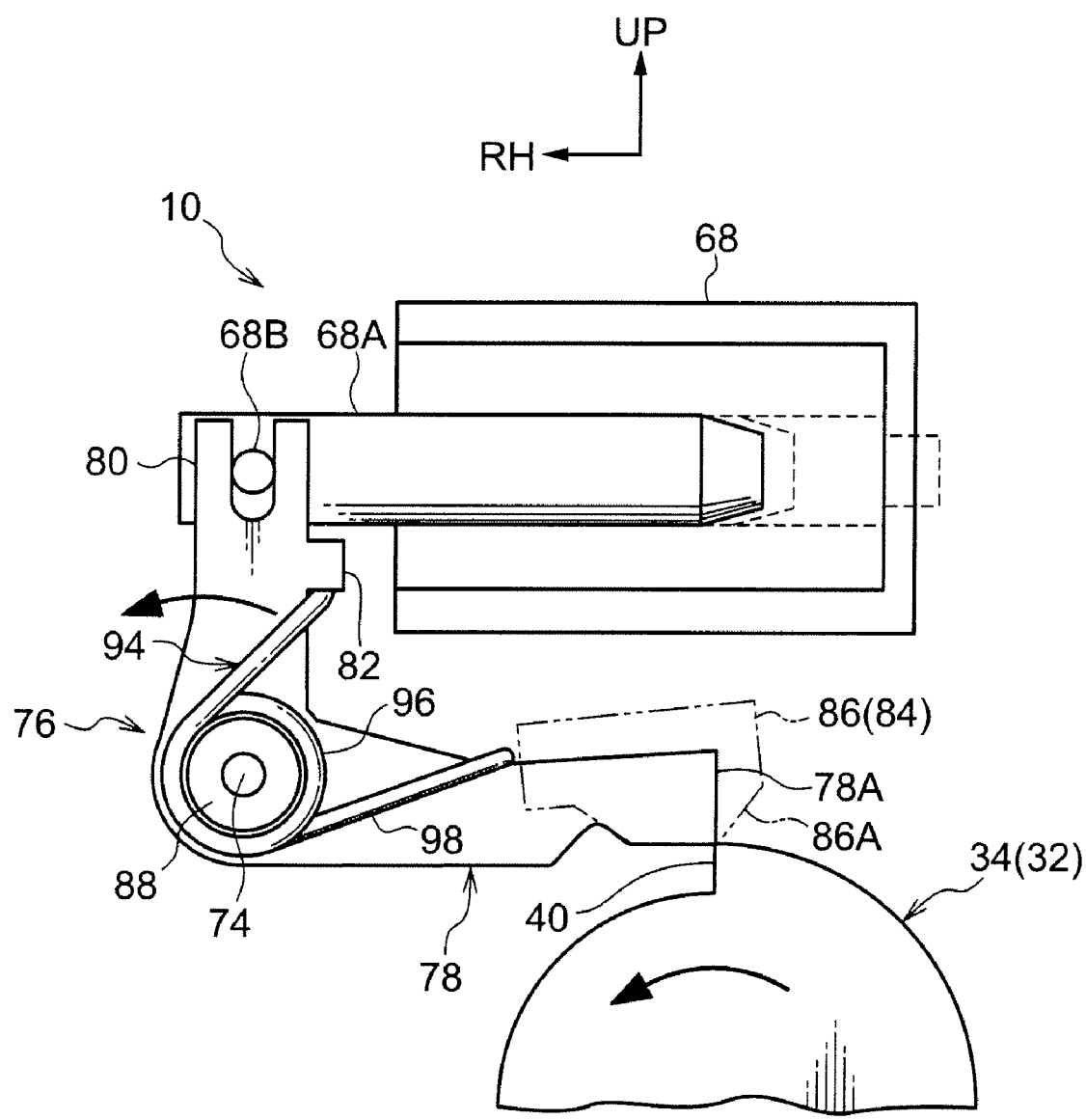
FIG. 9 is a cross sectional view showing an operation of the interlock unit according to the exemplary embodiment of the present invention when the shift lever is operated to move to a "P" shift position, when seen from the front.

As shown in FIG. 8 and FIG. 9, the lower side end of the link 78 and the lower side end (the release plate 86) of the release link 84 are made to protrude to the lower side from the open portion on the lower wall of the unit box 62, and are inserted in the accommodating cylinder 16 through an open portion on the lower wall of the mounting portion 60 of the lock body 12. The release plate 86 of the release link 84 abuts against the outer peripheral surface of the cam shaft 32 (the outer cylinder 34) by means of urging force of the torsion spring 94 (the rear side spiral portion 96).

When the key rotor 22 and the cam shaft 32 are rotated from the "ACC" position to the "LOCK" position, the regulating surface 40 of the cam shaft 32 (the outer cylinder 34) is made to abut against the release surface 86A of the release link 84, and the lower side end of the release link 84 is moved to the upper side.

As shown in FIG. 8, when the shift lever is operated to move to a shift position other than the "P" shift position and an increase in the amount of the plunger 68A protruding from the solenoid 68 is regulated, rotation of the link 78 is regulated (the link 78 is switched to a regulated state), and movement of the lower side end of the link 78 to the upper side (to the outer side in the radial direction of the accommodating cylinder 16) is regulated. To the contrary, as shown in FIG. 9, when the shift lever is operated to move to the "P" shift position and the increase in the amount of the plunger 68A protruding from the solenoid 68 is allowed (the link 78 is switched to an allowed state), rotation of the link 78 is allowed and movement of the lower side end of the link 78 to the upper side is allowed.

Next, the operation of the exemplary embodiment is described.

In the steering lock device 100 having the above-described structure, the key rotor 22 and the cam shaft 32 are arranged at the "LOCK" position, and the lock bar 54 is made to protrude from the fixed piece 14 of the lock body 12 to the rear side to engage with the steering shaft, whereby rotation of the steering shaft and the steering wheel is locked.

Further, by the ignition key 26 being inserted in the insertion hole 24 of the key rotor 22 and operated to rotate, the key rotor 22 and the cam shaft 32 are rotated to the "ACC" position, "ON" position and "START" position, so that the ignition switch 42 is operated.

When the key rotor 22 and the cam shaft 32 are rotated from the "LOCK" position to the "ACC" position, the inclined surface of the cam shaft 32 (the outer cylinder 34) is rotated so that the moving protrusion 46 of the slider 44 is pressed to the front side, whereby the slider 44 and the lock bar 54 are moved to the front side against the urging force of the compression spring 58. For this reason, when the key rotor 22 and the cam shaft 32 are rotated to the "ACC" position, protruding of the lock bar 54 from the fixed piece 14 of the lock body 12 is cancelled, and engagement of the lock bar 54 to the steering shaft is cancelled. As a result, rotation of the steering shaft and the steering wheel is allowed.

Further, when the key rotor 22 and the cam shaft 32 are rotated from the "LOCK" position to the "ACC" position, the slider 44 is moved to the front side as described above, whereby the rear end of the lock plate 30 is temporarily moved to the lower side against the urging force and the engagement protrusion 50 of the slider 44 overstrides the rear end of the lock plate 30. As a result, the engagement protrusion 50 of the slider 44 is engaged with the rear end of the lock plate 30, so movement of the slider 44 and the lock bar 54 to the rear side by means of the urging force of the compression spring 58 is stopped.

In addition, when the key rotor 22 and the cam shaft 32 are moved from the "ACC" position and arranged at the "START" position via the "ON" position, the front end of the lock plate 30 abuts against the peripheral surface of the key rotor 22, whereby rotation of the rear end of the lock plate 30 to the lower side is regulated and the state in which the engagement protrusion 50 of the slider 44 is engaged with the rear end of the lock plate 30 is maintained. Further, when the key rotor 22 and the cam shaft 32 are rotated from the "ACC" position to the "LOCK" position, the ignition key 26 regulates movement of the slide piece 28 toward the inner side in the radial direction of the key rotor 22, and due to the front end of the lock plate 30 abutting against the slide piece 28, rotation of the rear end of the lock plate 30 to the lower side is regulated and the state in which the engagement protrusion 50 of the slider 44 is engaged with the rear end of the lock plate 30 is maintained.

Consequently, the state in which movement of the slider 44 and the lock bar 54 to the rear side by means of the urging force of the compression spring 58 is stopped (not allowed) is maintained, and the state of cancel of the lock bar 54 protruding from the fixed piece 14 of the lock body 12 is maintained. For this reason, permission of rotation of the steering shaft and the steering wheel is maintained.

When the key rotor 22 and the cam shaft 32 are arranged at the "LOCK" position and the ignition key 26 is pulled out from the insertion hole 24 of the key rotor 22, movement of the slide piece 28 toward the inner side in the radial direction of the key rotor 22 is allowed, so that the slide piece 28 is moved toward the inner side in the radial direction of the key rotor 22 and the front end of the lock plate 30 is rotated upward by means of the urging force. As a result, the rear end of the lock plate 30 is rotated to the lower side and engagement of the engagement protrusion 50 of the slider 44 with the rear end of the lock plate 30 is cancelled. Thus, the slider 44 and the lock bar 54 are moved to the rear side by means of the urging force of the compression spring 50 and the lock bar 54 is made to protrude from the fixed piece 14 of the lock body 12 to the rear side. For this reason, the lock bar 54 is engaged with the steering shaft, and rotation of the steering shaft and steering wheel is locked.

Moreover, as shown in FIG. 8 and FIG. 9, in the interlock unit 10, when the key rotor 22 and the cam shaft 32 is rotated from the "ACC" position to the "LOCK" position, the regulating surface 40 of the cam shaft 32 (the outer cylinder 34) abuts against the release surface 86A of the release link 84 (the release plate 86), and the lower side end (the release plate 86) of the release link 84 is moved to the upper side against the urging force of the torsion spring 94 (the rear side spiral portion 96).

As shown in FIG. 8, when the shift lever of the shift lever device 72 is operated to be located at a shift position other than the "P" shift position, the solenoid 68 is driven and the increase in the amount of the plunger 68A protruding from the solenoid 68 is regulated. For this reason, rotation of the link 78 is regulated and movement of the lower side end of the link 78 to the upper side is regulated.

Consequently, when the key rotor 22 and the cam shaft 32 are rotated from the "ACC" position to the "LOCK" position and the lower side end (the release plate 86) of the release link 84 is moved to the upper side, the link 78 is not rotated integrally with the release link 84 and the lower side end of the link 78 does not move to the upper side, whereby the lower side end surface 78A of the link 78 is engaged with (abuts against) the regulating surface 40 of the cam shaft 32 (the outer cylinder 32). For this reason, rotation of the key rotor 22 and the cam shaft 32 from the "ACC" position to the "LOCK" position is regulated by the link 78, and pull-out of the ignition key 26 from the insertion hole 24 of the key rotor 22 is regulated (locked).

As shown in FIG. 9, when the shift lever is operated to be located at the "P" shift position, the solenoid 68 is not driven and the increase in the amount of the plunger 68A protruding from the solenoid 68 is allowed. Accordingly, rotation of the link 78 is allowed and movement of the lower side end of the link 78 to the upper side is allowed.

As a result, when the key rotor 22 and the cam shaft 32 are rotated from the "ACC" position to the "LOCK" position and the lower side end (the release plate 86) of the release link 84 is moved to the upper side, the link 78 is rotated integrally with the release link 84 and the lower side end of the link 78 is moved to the upper side, whereby the lower side end surface 78A of the link 78 is not engaged with (does not abut against) the regulating surface 40 of the cam shaft 32 (the outer cylinder 34). For this reason, rotation of the key rotor 22 and the cam shaft 32 from the "ACC" position to the "LOCK" position is allowed, and pull-out of the ignition key 26 from the insertion hole 24 of the key rotor 22 is allowed.

Incidentally, when assembling of the interlock unit 60 is carried out, as shown in FIGS. 1-3, in the state in which the fitting convex portion of the link 78 is fitted in the fitting concave portion 92 of the release link 84, the torsion spring 94 (particularly, the connecting portion 98) is temporarily elastically deformed, and the pair of spiral portions 96 of the torsion spring 94 are mounted to the respective spring holding shafts 88 of the link 78 and the release link 84, respectively. As a result, the link 78 and the release link 84 are held by the torsion spring 94, and the front side end 94B of the torsion spring 94 is caught in the hook portion 82 of the link 78, whereby the link unit 76 is assembled.

Next, as shown in FIG. 1, the shaft 74 is made to pass through (penetrate) the spring holding shafts 88 of the link 78 and the release link 84. Further, the tip end of the plunger 68A of the solenoid 68 is inserted between the pair of engagement frames 80 of the link 78, and the engagement shaft 68B (68B and 68B in FIG. 3) at the tip end of the plunger 68A is inserted in each of the pair of engagement frames 80, so as to mount the link 78 to the solenoid 68. Moreover, the solenoid 68 is mounted (fitted) within the case 64.

Subsequently, the mounting posts 64A of the case 64 are respectively inserted in the mounting frames 66A of the cover 66, so as to assemble the case 64 and the cover 66. Thus, the unit box 62 is formed. At this time, both ends of the shaft 74 in the axial direction thereof are made to be supported at the link 78 and the release link 84, respectively.

Finally, as shown in FIG. 4 and FIG. 5, the rear side end 94A of the torsion spring 94 is inserted in and made to pass through the passing hole 108 of the cover 66, and is made to extend to the upper side (to the outside of the unit box 62) from the interior of the passing convex portion 104 of the cover 66 via the movement hole 106. Further, the rear side end 94A of the torsion spring 94 is moved to the left side against the urging force of the torsion spring 94 (the rear side spiral portion 96), and is hooked in the engagement portion 110 of the cover 66. Incidentally, before the case 64 and the cover 66 are combined (assembled) with each other, similarly, the rear side end 94A of the torsion spring 94 may also be hooked in the engagement portion 110 of the cover 66 in similar way.

Further, as shown in FIG. 1 and FIG. 6, when the interlock unit 10 is assembled in the mounting portion 60 of the lock body 12, the mounting protrusion 62A of the unit box 62 is inserted in the mounting hole 60A of the mounting portion 60, and the mounting plate 62B of the unit box 62 is fastened to the mounting cylinder 60B of the mounting portion 60 by screw-engagement of the screw 102, whereby the unit box 62 is fixed to the mounting portion 60.

Here, in the interlock unit 10, the solenoid 68, the shaft 74, the link 78, the release link 84 and the torsion spring 94 are integrated together (made into a unit) by the unit box 62, and by the interlock unit 10 (the unit box 62) being mounted in the mounting portion 60 of the lock body 12, the solenoid 68, the shaft 74, the link 78, the release link 84 and the torsion spring 94 can be assembled and mounted to the lock body 12.

Consequently, it is not necessary that the solenoid 68, the shaft 74, the link 78, the release link 84 and the torsion spring 94 are each separately mounted (assembled) in the lock body 12, that is, the solenoid 68, the shaft 74, the link 78, the release link 84 and the torsion spring 94 can be easily mounted (assembled) in the lock body 12.

In addition, as shown in FIG. 10, the assembling process of the interlock unit 10 (another line shown in FIG. 10) can be separated from the assembling process of the steering lock device 100 (a main line A or a main line B shown in FIG. 10). For this reason, in the assembling process of the steering lock device 100, only the interlock unit 10 assembled in the assembling process of the interlock unit 10 is mounted in the mounting portion 60 of the lock body 12, so, the number of assembling steps in the assembling process of the steering lock device 100 can be reduced.

Further, it suffices that the mounting portion 60 of the bock body 12 is formed into such a shape for assembling with the unit box 62, and it is not necessary that the mounting portion 60 is formed into such a shape for assembling directly with the solenoid 68, the shaft 74, the link 78, the release link 84 and the torsion spring 94. As a result, the shape of the mounting portion 60 of the lock body 12 can be made simple, and the structure of a mold for forming the lock body 12 can also be simplified.

Moreover, as shown in FIG. 6, by making the mounting portions 60 of different type (different type of vehicles) of lock bodies 12 (for example, the lock body 12 in the main line A and the lock body 12 in the main line B shown in FIG. 10) the same shape, the same interlock unit 10 can be assembled to the different type of lock bodies 12. For this reason, the interlock unit 10 can be easily used commonly with respect to the different type (different type of vehicles) of lock bodies 12.

In the assembling process of the interlock unit 10, mounting of the shaft 74 in the link unit 76 (the link 78, the release link 84 and the torsion spring 94), assembling of the unit box 62 (assembling of the case 64 and the cover 66), mounting of the solenoid 68 in the unit box 62 (the case 64 and the cover 66), and mounting of the shaft 74 in the unit box 62 (the case 64 and the cover 66) are each carried out along the front and rear direction (in the axial direction of the shaft 74). For this reason, it is not necessary that the unit box 62, the solenoid 68, the link unit 76 and the shaft 74 are assembled from different directions. As a result, the unit box 62, the solenoid 68, the link unit 76 and the shaft 74 can be easily mounted.

Further, when the unit box 62 is assembled (the case 64 and the cover 66 are assembled with each other), one end of the shaft 74 in the axial direction thereof is supported by the case 64, and the other end of the shaft 74 in the axial direction thereof is supported by the cover 66. For this reason, as compared to a case in which both ends of the shaft in the axial direction are each supported by being sandwiched between the case 64 and the cover 66 in the radial direction, the shaft 74 can be securely supported in the unit box 62.

Furthermore, even after the unit box 62 is assembled, the rear side end 94A of the torsion spring 94 is inserted in and made to pass through the passing hole 108 of the cover 66, and is made to extend to the outside from the unit box 62 via the movement hole 106. Subsequently, the rear side end 94A of the torsion spring 94 is moved to the left side and can be hooked in the engagement portion 110 of the cover 66. For this reason, when the unit box 62 is assembled, the rear side end 94A of the torsion spring 92 does not need to be hooked in the engagement portion 110 of the cover 66. As a result, the rear side end 94A of the torsion spring 94 can be easily hooked in the engagement portion 110 of the cover 66.

Incidentally, in the exemplary embodiment, the structure in which the rear side end 94A of the torsion spring 94 is hooked in the engagement portion 110 provided outside the unit box 62 is shown, but a structure in which the rear side end 94A of the torsion spring 94 is hooked in the engagement portion 110 provided inside of the unit box 62 is also possible. In this case, with an operation hole being formed so as to pass through (penetrate) at the unit box 62, a structure in which after the unit box 62 is assembled, the rear side end 94A of the torsion spring 94 is operated to move from the operation hole and is hooked in the engagement portion 110 at the inner side of the unit box 62 may be employed.

What is claimed is:

1. A key regulating device comprising:
   a driving section provided with a driving member, the driving section being configured to drive the driving member;
   a regulating member that can be switched between a regulated state and an allowed state by driving the driving member, the regulating member regulating rotation of a key to a predetermined rotational position when switched to the regulated state and allowing rotation of the key to the predetermined rotational position when switched to the allowed state; and
   an integration assembly means including first and second discrete side members having mutually engageable surfaces for capturing the driving section and the regulating member when the surfaces of the first and second discrete side members are engaged together such that the driving section, the regulating member, and the integration assembly means are configured to be mounted to a subject of assembly
   wherein the regulating member includes an attachment portion that attaches to the driving member of the driving section, and wherein said first and second side members surround said attachment portion when the engageable surfaces of the first and second discrete side members are engaged together.

2. The key regulating device of claim 1, further comprising a support shaft that rotatably supports the regulating member, wherein the driving section, the regulating member, the first and second discrete side members and the support shaft are configured to be mounted together along an axial direction of the support shaft.

3. The key regulating device of claim 1, further comprising an urging member that urges the regulating member, wherein the urging member is configured to be engaged with the integration assembly means in a state in which the driving section and the regulating member are integrated by the integration assembly means.

4. The key regulating device of claim 2, further comprising an urging member that urges the regulating member, wherein the urging member is configured to be engaged with the integration assembly means in a state in which the driving section and the regulating member are integrated by the integration assembly means.

5. The key regulating device of claim 2, wherein the first and second side members are engaged together along the axial direction of the support shaft.

6. The key regulating device of claim 5, wherein the engaging surfaces of the first and second side members include interfitting mating portions.

7. The key regulating device of claim 2, wherein the support shaft has side ends that are supported at the first and second side members, respectively.

8. The key regulating device of claim 1, further comprising a support shaft that rotatably supports the regulating member, and wherein the regulating member and the first and second side members include openings for receiving the support shaft, and said first and second side members further function to align the shaft-receiving opening of the regulating member with their respective shaft-receiving openings when the surfaces of the first and second discrete side members are engaged together.

9. The key regulating device of claim 2, wherein one end of the support shaft in the axial direction and another end of the support shaft in the axial direction are respectively supported at the first and second discrete side members when the surfaces of the first and second side members are engaged together.

* * * * *